United States Patent [19]

Weston et al.

[11] 4,390,509

[45] Jun. 28, 1983

[54] PROCESS FOR MANUFACTURING AMMONIUM PHOSPHATE UTILIZING AN OXALIC ACID ACIDULATING PROCESS

[75] Inventors: Charles W. Weston, Prarieville; Padraic S. O'Neill, Baton Rouge, both of La.

[73] Assignee: Agrico Chemical Company, Tulsa, Okla.

[21] Appl. No.: 254,647

[22] Filed: Apr. 16, 1981

Related U.S. Application Data

[63] Continuation of Ser. No. 128,885, Mar. 10, 1980, abandoned.

[51] Int. Cl.$^3$ ................. C01B 15/16; C01B 25/26
[52] U.S. Cl. ................................. 423/313; 423/310; 423/319; 423/415 A; 423/430; 423/359; 260/501.15; 562/597; 564/152
[58] Field of Search ............... 423/319, 320, 313, 359, 423/415 A, 430, 308, 309, 316; 564/152; 260/501.15; 562/597

[56] References Cited

U.S. PATENT DOCUMENTS

| | | | |
|---|---|---|---|
| 2,718,453 | 9/1955 | Beckman | 423/244 |
| 3,337,297 | 8/1967 | Cook et al. | 423/305 |
| 4,108,957 | 8/1978 | Michel | 423/319 |
| 4,118,589 | 10/1978 | Cassar et al. | 560/204 |

FOREIGN PATENT DOCUMENTS 2213435  10/1973  Fed. Rep. of Germany.

*Primary Examiner*—O. R. Vertiz
*Assistant Examiner*—Gregory A. Heller
*Attorney, Agent, or Firm*—Richards, Harris & Medlock

[57] ABSTRACT

A process for the manufacture of phosphoric acid from phosphate rock is provided. The phosphate rock is digested or acidulated with an acid solution containing oxalic acid to produce phosphoric acid and calcium oxalate. Useful by-products are also formed and include calcium carbonate and ammonium oxalate. More specifically, the process provides for the production of phosphoric acid, ammonium phosphate and useful by-products utilizing synthesis gas and air to produce oxalic acid and ammonia. The synthesized oxalic acid is utilized for phosphate rock digestion to produce phosphoric acid, which can be reacted with ammonia to produce ammonium phosphate. Calcium oxalate from phosphate rock digestion is utilized to produce calcium carbonate, ammonium oxalate and oxamide.

10 Claims, 1 Drawing Figure

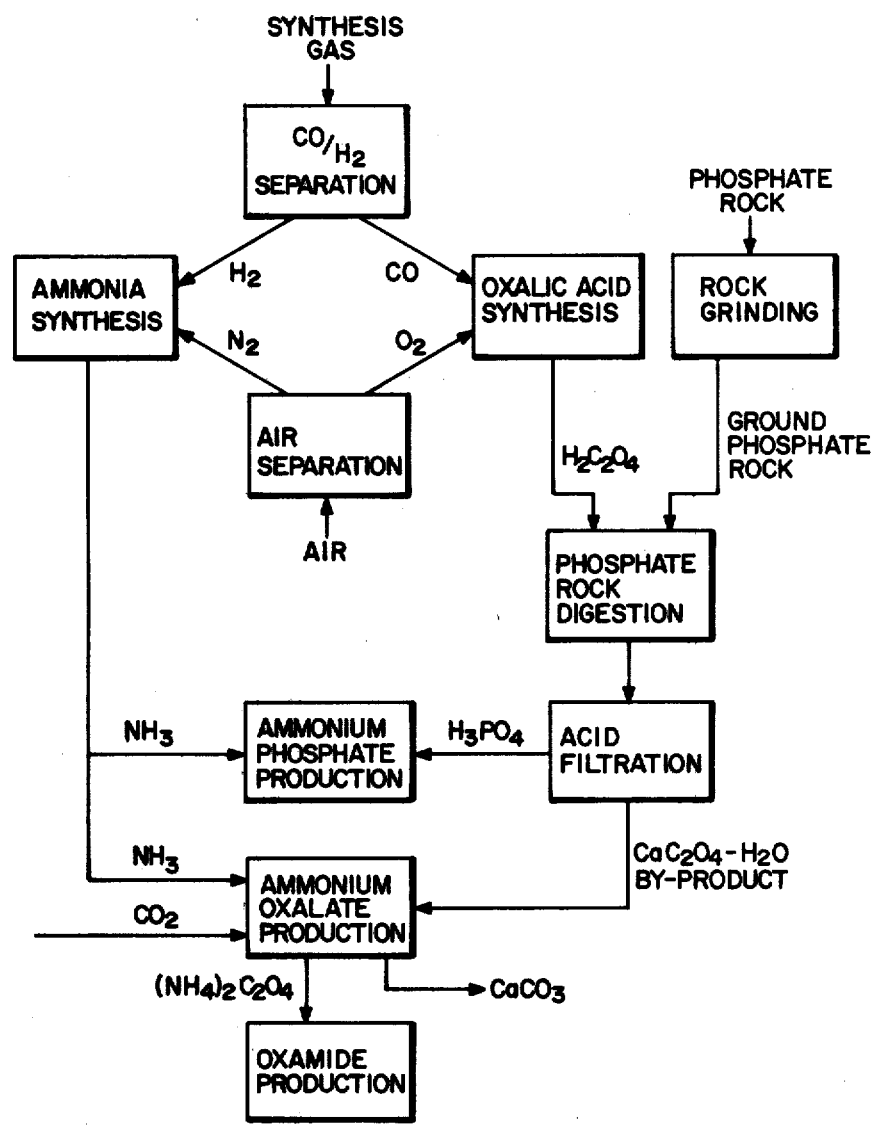

PROCESS FOR MANUFACTURING AMMONIUM PHOSPHATE UTILIZING AN OXALIC ACID ACIDULATING PROCESS

This application is a continuation of application Ser. No. 128,885, filed Mar. 10, 1980 now abandoned.

TECHNICAL FIELD

The present invention pertains to a process utilizing synthesis gas and air to produce oxalic acid and ammonia, which products are then utilized with phosphate rock to produce phosphoric acid, ammonium phosphate and useful by-products.

BACKGROUND ART

The primary objective in the phosphate fertilizer industry is to convert the apatite in phosphate rock to a form in which the phosphorus is available to plants. Apatite is quite insoluble and, under most farming situations, is of little value as a supplier of nutrient phosphate. The most common method for making it available to plants is treatment with a mineral acid such as sulfuric, phosphoric, hydrochloric, or nitric. Use of nitric or hydrochloric acids, however, is of limited utility since these two acids yield mixtures of phosphoric acid and soluble calcium salts which are not easily separable from the phosphoric acid. The separation of the soluble calcium salt is important, since ammoniation of the unseparated mixtures to produce ammonium phosphate type fertilizers results in reversion of a major portion of the phosphate to an insoluble form not readily available as plant nutrients.

A method for manufacture of phosphoric acid from phosphate rock is disclosed in U.S. Pat. No. 4,108,957 to Michel. Crushed phosphate rock is mixed and digested with dilute phosphoric acid to form a slurry and convert the rock into monocalcium phosphate. Oxalic acid is thereafter added to precipitate the calcium as calcium oxalate. Phosphoric acid is recovered in a conventional manner and the calcium oxalate is treated with sulfuric acid to produce gypsum and recover oxalic acid.

Sulfuric acid as an acidulant results in the precipitation of the calcium component of the phosphate rock ores as an insoluble calcium sulfate salt, usually gypsum ($CaSO_4 \cdot 2H_2O$). This calcium sulfate salt is readily separable from the phosphoric acid, which acid can then be ammoniated to yeild soluble ammonium phosphate fertilizers. This practice has become an accepted method of producing nitrogen and phosphorus-containing fertilizers in the industry.

Although the use of sulfuric acid as a phosphate rock accidulant is one current practice, this alternative itself has several distinct disadvantages. A major disadvantage is the total dependence of the fertilizer industry upon low cost sulfur supplies for the production of sulfuric acid. However, recovery of sulfur from sulfur ore bodies by the well known Frasch process is energy intensive, and has resulted in an ever-increasing price for sulfur raw material as fuel prices continue to escalate. In addition, use of sulfuric acid results in the production of large tonnages of by-product gypsum. This by-product cannot presently be converted economically into a saleable product in the United States, and the disposal of this material represents a significant pollution control problem.

Therefore, a need exists for a process of phosphoric acid manufacture from phosphate rock, which process does not employ sulfuric acid or produce by-products which present significant pollution control problems. Further, a need exists for a method of manufacturing phosphoric acid from phosphate rock, which method can produce relatively pure phosphoric acid from low grade phosphate rock that includes large amounts of impurities and also produce usable by-products. Finally, a need exists for a process that can utilize basic starting materials such as air, synthesis gas and phosphate rock to produce phosphoric acid, ammonium phosphate and useful by-products.

DISCLOSURE OF THE INVENTION

A process for producing phosphoric acid, ammonium phosphate and useful by-products from synthesis gas, air and phosphate rock is provided. Synthesis gas and air are separated into $H_2$, $CO$, $N_2$ and $O_2$ fractions and utilized according to known methods to produce ammonia and oxalic acid or oxalic acid derivatives that can be hydrolyzed to oxalic acid. Oxalic acid is utilized to form phosphoric acid from phosphate rock which can be thereafter ammoniated with ammonia synthesized from the $N_2$ and $H_2$ fractions.

More specifically, the process includes phosphate rock digestion or acidulation utilizing oxalic acid to produce phosphoric acid. The phosphate rock is acidulated by an acid solution containing oxalic acid and another acid to increase the solubility of phosphate rock in the solution, to convert the phosphate rock into primarily precipitated calcium oxalate and phosphoric acid. The reaction can be carried out at temperatures in the range from ambient to about 110° C. Higher temperatures result in more rapid dissolution of the phosphate rock. The resulting calcium oxalate precipitate can be separated from the product phosphoric acid by filtration or any other suitable method. The by-product calcium oxalate can be used to form calcium carbonate and carbon monoxide or calcium carbonate and ammonium oxalate, by-products which have commercial uses. The ammonium oxalate can be further converted into oxamide.

Alternatively, an oxalic acid derivative that hydrolyzes to form oxalic acid can be utilized to digest the phosphate rock. In one embodiment, an oxalic acid ester is hydrolyzed to form oxalic acid and an alcohol. The alcohol is separated from the oxalic acid and can be recycled for use in oxalic acid ester synthesis.

In accordance with the present invention, the production of ammonia and oxalic acid or its derivatives from synthesis gas and air are integrated so that the major components of each are utilized in the production of ammonia and oxalic acid. Further, integration allows use of the ammonia to ammoniate phosphoric acid, produced by digestion of phosphate rock with oxalic acid, to produce ammonium phosphate. By-products resulting from the digestion of phosphate rock can be utilized.

The by-product calcium oxalate can be used to form calcium carbonate and carbon monoxide or calcium carbonate and ammonium oxalate, by-products which have commercial uses. The ammonium oxalate can be further converted into oxamide.

BRIEF DESCRIPTION OF THE DRAWINGS

The invention can be more completely understood by reference to the drawing, together with the Detailed Description of the Invention.

The drawing is a schematic diagram of the process of the present invention.

DETAILED DESCRIPTION OF THE INVENTION

According to the invention, a process is provided for the production of phosphoric acid, monoammonium phosphate and useful by-products from synthesis gas, air and phosphate rock. The process incorporates known methods of ammonia synthesis from hydrogen and nitrogen and known methods of oxalic acid synthesis from carbon monoxide and oxygen. Phosphoric acid is produced by digesting phosphate rock with oxalic acid. In one embodiment of the present invention, the phosphoric acid is then reacted with ammonia to produce ammonium phosphate. Calcium oxalate is produced as a by-product from the phosphate rock digestion and can be reacted with ammonia and carbon dioxide to produce ammonium oxalate and calcium carbonate. The ammonium oxalate can be optionally converted into ammonium oxamide.

Synthesis gas contains primarily carbon monoxide and hydrogen, plus low percentages of carbon dioxide and usually of nitrogen (generally less than about 2.0%). Such mixturs result from reacting carbon-rich substances with steam (steam reforming) or oxygen (partial oxidation). The carbon-rich substances are generally selected from the group consisting of coal, lignite, peat, various petroleum feedstocks, biomass and natural gas. Any source of synthesis gas or any method for producing synthesis gas can be used in conjunction with the process of the present invention. Thus, a gasification plant may also be incorporated in the process according to the present invention. The carbon monoxide required for oxalic acid or oxalate ester synthesis may be provided by separation thereof from the synthesis gas mixture.

According to one embodiment of the present invention, synthesis gas is separated into carbon monoxide and hydrogen. The carbon monoxide from the synthesis gas is then utilized together with air or oxygen, obtained from a separation of air into oxygen and nitrogen, in the oxalic acid synthesis step. Suitable methods for preparing oxalic acid and esters of oxalic acid are disclosed in U.S. Pat. No. 4,118,589 to Cassar et al., U.S. Pat. No. 3,994,960 to Yamazaki et al., U.S Pat. No. 4,005,128 to Zehner et al., U.S. Pat. No. 4,005,129 to Zehner et al., U.S. Pat. No. 4,005,130 to Zehner, U.S. Pat. No. 4,005,131 to Zehner and German Pat. (Offenlegungsschrift) No. 2,213,435 to Ganzler et al., all of which are hereby incorporated by reference. For example, in accordance with U.S. Pat. No. 4,118,589, oxalic acid and esters of oxalic acid may be prepared by a catalytic process by an oxidative reaction in a liquid phase of carbon monoxide and water or alcohols with oxygen in the presence of redox catalytic systems based on salts of Pd (II) and other specific metal salts.

Thus, the present invention integrates the production of phosphoric acid with the synthesis of oxalic acid or oxalic acid derivatives from carbon monoxide obtained by gasification of coal, lignite, peat, petroleum derivatives, biomass or natural gas. Further integration can result by synthesizing ammonia from synthesis gas and air which is utilized to form ammonium phosphates from the phosphoric acid and ammonium oxalate from the calcium oxalate by-product obtained by the phosphate rock digestion.

In one aspect of the invention, a process is provided for producing phosphoric acid and usable by-products from phosphate rock. Phosphate rock is digested by reacting it with an aqueous acid solution containing oxalic acid. The acid solution will generally contain a mixture of oxalic acid and phosphoric acid. For example, part of the phosphoric acid produced from the phosphate rock may be recycled to form an acid solution comprising a mixture of oxalic acid and phosphoric acid. Some phosphoric acid is recycled in order to avoid pumping problems caused by an excessively high solids content in the reaction mixture. Preferably, the crushed phosphate rock is reacted with an acid mixture which contains from about 5% to about 50% oxalic acid by weight of the acid mixture. The amount of oxalic acid used should be at least a stoichiometric equivalent of the metals to be removed from the phosphate rock. Generally, from about 1.0 tons to about 1.5 tons of oxalic acid are used per ton of phosphate rock. As used herein, in calcuating the amount of oxalic acid or the percent of oxalic present in a solution, the dihydrate form of oxalic acid (HOOCCOOH 2H$_2$O) has been used. Thus, according to applicant's invention, oxalic acid is used as a true acidulant in the digestion of the phosphate rock.

Generally, prior to digestion, the phosphate rock ore is crushed and ground to a size of from about 1.7 millimeters (1,700 microns) about 0.075 millimeters (75 microns) to facilitate digestion. Grinding and crushing may be accomplished by any suitable method known to those skilled in the art. For certain types of phosphate rock, such as some North Carolina phosphate rock, size reduction does not significantly facilitate digestion.

In one embodiment of the present invention, the phosphate rock is acidulated by the in situ formation of oxalic acid. The phosphate rock is mixed with an acid solution or a suspension that initially is an aqueous phosphoric acid solution of an oxalic acid derivative that forms oxalic acid upon hydrolysis. For example, a mixture of phosphoric acid and dimethyl oxalate will form oxalic acid. In this embodiment, a mixture of phosphate rock, an oxalic acid derivative and an acid, preferably phosphoric, will be maintained at a temperature of from about 70° C. to about 110° C. to facilitate formation of oxalic acid and to facilitate the reaction of oxalic acid with the phosphate rock. Alternatively, the oxalic acid may be formed by the hydrolysis of the oxalate ester prior to contact with the phosphate rock.

Derivatives of oxalic acid that form oxalic acid upon hydrolysis can be used in accordance with the present invention. The oxalic acid derivative will usually be of the form:

R$_1$OOCCOOR$_2$, where R$_1$ and R$_2$ may be hydrogen or any aliphatic, alicyclic, aromatic, hydroxylalkyl, or haloalkyl group.

In particular, suitable oxalate esters include dimethyl oxalate, diethyl oxalate, di-N-butyl oxalate, di-N-propyl oxalate and di-isopropyl oxalate. The amount of oxalic acid derivative present in the acid solution should be such that the concentration of oxalic acid after hydrolysis is from about 5% to about 50% oxalic acid by weight of the acid solution. The initial acid solution containing the oxalic acid derivative should be preferably at a pH of less than 2.0 to facilitate hydrolysis of the oxalic acid derivative into oxalic acid.

The oxalic acid present in the acid solution reacts with phosphate rock to produce calcium oxalate and phosphoric acid. When an oxalic acid ester derivative is used, alcohol is also produced as a by-product of the hydrolysis of the oxalic acid derivative and is available for recovery and recycle and could be used in an oxalic ester synthesis process as previously described.

The preferred method of alcohol recovery depends upon the alcohol used in ester synthesis. For lighter alcohols such as methanol or ethanol, the alcohol may be stripped from the phosphoric acid solution by distillation, either after calcium oxalate removal or before, from the reaction slurry as the alcohol is formed by hydrolysis.

As an example of use of an acid solution initially containing an oxalate ester and phosphoric acid, oxalic acid is formed in situ from the hydrolysis of dimethyl oxalate by heating in the presence of phosphoric acid. The phosphate rock may also be present with the initial acid solution or can be mixed with the acid solution after formation of the oxalic acid. Reaction of the resulting solution provides phosphoric acid and calcium oxalate. Thus, the phosphate rock, according to the method of the present invention, may be acidulated with oxalic acid which can be formed in situ by the hydrolysis of an oxalic acid derivative.

Preferably, the mixture containing the acid solution and crushed phosphate rock is maintained at a temperature of from about 70° C. to about 110° C. for a period of from about 2 hours to about 8 hours for digestion of the rock and formation of phosphoric acid and calcium oxalate. The mixture should be agitated during this digestion period.

In addition to the formation of calcium oxalate precipitate from the crushed phosphate rock, oxalates of the various metallic impurities present in the phosphate rock are also formed. Because the water solubility of calcium oxalate is much less than the water solubility of calcium sulfate and because the oxalates of the metallic impurities generally found in phosphate rock are also highly water insoluble, the phosphoric acid produced from the process of the present invention has fewer impurities than, for example, phosphoric acid produced in a process that incorporates sulfuric acid or nitric acid acidulation of the phosphate rock.

After formation of the phosphoric acid and calcium oxalate and other oxalate precipitates from components such as magnesium, aluminum and iron, which may be present in the rock, the phosphoric acid is separated from the mixture. Any suitable method may be used to accomplish this, such as filtration or centrifugation. The slurry containing the precipitates may be cooled to minimize post precipitation in the phosphoric acid after removal of the solids. Most preferably, the removal of the precipitates occurs at a temperature of from about 20° C. to about 50° C. so that the amount of precipitate is increased. To maximize production of phosphoric acid, the separated precipitate can be washed with water to recover any entrained phosphoric acid. This solution can be used along with a portion of the phosphoric acid initially separated from the precipitate to provide a solvent for the dissolution of oxalic acid in the preparation of the acid solution which is used to digest the phosphate rock.

The bulk of the precipitate formed by the digestion of phosphate rock is calcium oxalate. According to one specific embodiment of the method of the present invention, calcium oxalate is dehydrated and decomposed by heating to produce by-products calcium carbonate and carbon monoxide. Calcium carbonate is useful as an agricultural liming material or as a raw material for cement production.

Nitrogen from the air separation step and hydrogen from separation of the synthesis gas, as previously described, is utilized to synthesize ammonia. Any process known to those skilled in the art for converting gaseous hydrogen and nitrogen into ammonia may be used in the proces of the present invention. For example, the ammonia may be synthesized by use of the well-known Haber-Bosch process. As shown in FIG. 1, the ammonia is utilized for ammoniation of the phosphoric acid to produce ammonium phosphate. The ammonia is also utilized with the calcium oxalate and a source of carbon dioxide to form ammonium oxalate and calcium carbonate. To produce an ammonium oxalate, an aqueous solution of ammonium carbonate is formed with the ammonia and carbon dioxide. The calcium oxalate is then treated with the aqueous ammonium carbonate solution to produce calcium carbonate and ammonium oxalate. Ammonium oxalate may be further treated by heating to produce ammonium oxamate ($NH_4C_2O_3NH_2$) or, upon further heating, oxamide ($C_2O_2(NH_2)_2$), both of which are useful as slow release nitrogen fertilizers.

In accordance with the present invention, an ammonia plant utilizing synthesis gas is integrated with a phosphoric acid plant. Certain problems and inefficiencies are apparent in the operation of an ammonia plant based on coal, lignite, or heavy fuel oil which results in the cost of ammonia as produced in such a plant being considerably higher than is the case in the more conventional natural gas or naphtha based plant. These drawbacks are: (a) raw gas has considerable quantities of sulfur compounds which must be removed in elaborate and costly special purpose scrubbers; (b) significant quantities of ash and clinker are produced which have no commercial value and must be contained in a large waste treatment area; (c) large volumes of contaminated water are produced which must be treated with consumption of chemicals prior to discharge; (d) relatively expensive, low sulfur, low ash coals must be used normally so as to minimize the problems described as aforesaid in this paragraph under subdivisions (a), (b) and (c); and (e) pure oxygen gas must be used to provide the correct nitrogen to hydrogen ratio in the feed gas to the ammonia plant.

The combination of an ammonia plant with an oxalic acid or oxalate ester based phosphoric acid plant as set forth herein can result in a number of beneficial effects in an integrated complex. For example, calcium oxalate can be recycled to the gasification unit to effect decomposition to calcium carbonate and carbon monoxide will increase the carbon monoxide content of the gas and will eliminate or substantially reduce the undesirable sulfur compounds and nitrogen oxides which will react with the calcium carbonate and be removed with the solid by-product. The ash and/or clinker from the gasification plant may be used as a filter aid in the phosphoric acid plant and thereby be combined with the calcium oxalate waste from a phosphoric acid plant to considerably reduce the waste ash and clinker treatment costs. In the event of recycle of the calcium oxalate to the gasification plant, the ash and clinker will be substantially in the form of calcium carbonate, an innocuous material. Because of the large excess of calcium oxalate available over that required for sulfur removal in typical commercial coals, relatively low grade, high sulfur coals which may also have high ash contents may be used for ammonia and oxalic acid production with considerable savings in raw material costs. In certain cases, it may be possible to use air rather than oxygen to gasify coal for ammonia with large savings in the capital equipment required. The availability of calcium oxalate at the same plant site as ammonia will enable production of oxamide, a very desirable, slow release nitrogen fertilizer which would compliment the existing range of ammonia-based nitrogen fertilizers which are almost all water-soluble salts and, hence, fast release materials.

The next stage in integration of the plants includes recycle of calcium oxalate from the phosphoric acid plant to the coal, lignite, peat, oil or biomass gasifier. This will result in major savings in gas purification costs. It will produce a dry calcium carbonate which has commercial value and will result in savings in coal and oxygen consumption due to recycle of almost one-half of the carbon monoxide required for oxalic acid or oxalate ester synthesis.

Thus, the method of the present invention provides a process for the production of phosphoric acid from phosphate rock while producing useful by-products without creating significant pollution control problems.

The following examples will aid in illustrating and understanding the present invention:

EXAMPLE 1

Fifty grams of dry Florida phosphate rock containing 29.92 percent $P_2O_5$ (65.3 BPL) was ground to a fineness such that about 47 percent passed through a U.S. Standard 200 mesh screen.

The rock sample was added with 56 grams of oxalic acid dihydrate in several portions over 1.5 hours to a phosphoric acid mixture consisting of 300 grams of 31 percent $P_2O_5$ phosphoric acid and 30 grams of water. The mixture was stirred during this time and held at a temperature of from 70° C. to 79° C. to form a resulting slurry. The resulting slurry was then cooled for 0.5 hours at 35° C. The slurry was then filtered, resulting in a filtrate containing phosphoric acid having 36.22 percent $P_2O_5$ and a specific gravity of 1.344. This acid contained only 0.82 percent soluble oxalate calculated as $C_2O_4$. The filter cake was then washed with two 15 ml portions of water at 70° C. to yield two solutions containing 23.08 percent $P_2O_5$ and 5.86 percent $P_2O_5$, having specific gravities of 1.191 and 1.023, respectively. Overall recovery of $P_2O_5$ from the phosphate rock across the filter was 88.7 percent.

The filter cake was analyzed and was found to contain 2.58 percent $P_2O_5$, with 1.04 percent as water soluble $P_2O_5$ and 1.54 percent water insoluble $P_2O_5$.

EXAMPLE 2

Pure phosphoric acid (150 grams, 85 percent $H_3PO_4$) was diluted with 150 grams of water. About 5 grams of calcium oxalate monohydrate seed crystals were added to the phosphoric acid solution. The mixture was then warmed to 70° C. and a 10 gram aliquot of Florida phosphate rock was dried and ground as in Example 1 and was added along with a 10 gram aliquot of crystalline dimethyl oxalate (98 percent $C_2O_4(CH_3)_2$) over a 10 minute interval to the phosphoric acid solution. The mixture was then agitated thoroughly and five-10 gram aliquots of the phosphate rock and five-10 gram aliquots of crystalline dimethyl oxalate were added to the resulting slurry during a one hour period so that a total of 60 grams of phosphate rock and 60 grams of dimethyl oxalate were present in the resulting slurry. The resulting slurry was maintained at 70° C. for approximately thirty minutes and was then filtered. The filter cake was then washed with 50 ml of warm water (at 40° C.–50° C.) followed by 50 ml of cold water (at 25° C.) and the filter cake was then dried at 100° C. The filtrate weighed 199.2 grams and contained 77.0 grams of $P_2O_5$. The combined washes totaled 144.1 grams and contained 31.9 grams of $P_2O_5$. The dried cake weighed 80.2 grams and retained 1.5 grams of $P_2O_5$. This represents a solubilization of 92 percent of the $P_2O_5$ present in the phosphate rock.

EXAMPLE 3

A mixture of 60 grams dimethyl oxalate, 64 grams of Florida phosphate rock containing 30.5 percent $P_2O_5$ and ground to a fineness such that 46 percent passed a U.S. Standard 200 mesh screen and 325 grams of 36.2 percent $P_2O_5$ phosphoric acid was agitated and heated at a temperature of from 93° C. to 98° C. for two hours in an enclosed vessel. The vessel was fitted with a water-cooled condenser and collection flask for recovery of by-product methanol. The phosphoric acid used consisted of two portions, one portion 273 grams, contained 26.8 percent $P_2O_5$ and had a minor element analysis of 0.127 percent Fe, 0.055 percent Al, 0.022 percent Mg, 0.093 percent Ca, and the other portion of phosphoric acid contained 88 grams of pure phosphoric acid containing 61.6 percent $P_2O_5$. 77 grams of water were added to the systems and about two drops of oleic acid were added to prevent foaming. The distillate collected during this period weighed 17 grams and contained 56 percent methanol. After cooling to 20° C., the calcium oxalate precipitate was removed by filtration, yielding a filtrate weighing 349 grams and containing 30.14 percent $P_2O_5$, 0.186 percent Fe, 0.070 percent Al, 0.028 percent Mg and 0.463 percent Ca. The filter cake was washed by displacement with 100 ml of water, resulting in a filter cake which weighed 124.6 grams wet and 81.0 grams after being dried at 100° C. The solid filter cake contained a total of 6.45 percent $P_2O_5$. A water soluble $P_2O_5$ determination showed 6.11 percent $P_2O_5$. The washings weighed 136.0 grams and contained 16.78 percent $P_2O_5$. Based on a soluble $P_2O_5$ recovery of 98.5 percent, the elements Fe, Al and Mg contained in the rock were dissolved to the extent of 22 percent, 3.0 percent and 5.3 percent, respectively.

EXAMPLE 4

546 grams of a phosphoric acid solution which had been obtained by digestion of phosphate rock with dimethyl oxalate, as in Example 3, was diluted with 104 grams of water. This solution, containing 30.0 percent $P_2O_5$, was then heated to 90° C. Two drops of oleic acid were added to prevent foaming. Commercial Florida coarse (unground) pebble phosphate rock, dried containing 30.5 percent $P_2O_5$ was added to this solution along with crystalline dimethyl oxalate over a period of 2.5 hours, 10 grams of each being added over every fifteen minute interval, thereby resulting in a total of 120 grams phosphate rock and 120 grams of dimethyl oxalate being introduced. The slurry was agitated and maintained at 90° C. during the entire reaction time. The slurry was then cooled to 35° C. and filtered. The filtrate weighed 482 grams, had a specific gravity of 1.47 and contained 37.3 percent $P_2O_5$. The filter cake was washed with two 100 ml portions of water at 60° C.

The liquor from the first wash weighed 146 grams and had a specific gravity of 1.23 and contained 23.7 percent $P_2O_5$. The second wash liquor weighed 105 grams and had a specific gravity of 1.05 and a $P_2O_5$ content of 4.33 percent. The wet filter cake weighed 206 grams and when dried weighed 154 grams containing 2.15 percent $P_2O_5$. This represents a dissolution of 91 percent of the $P_2O_5$ originally present in the phosphate rock. This example demonstrates the utility of the method in accordance with the present invention using coarse pebble phosphate rock.

EXAMPLE 5

Three samples of calcium oxalate washed filter cake produced from a run in a similar manner to that described in Example 3 were subjected to heat treatment at three different temperatures. The cake had been dried at 100° C. and contained 2.93 percent $P_2O_5$ and no measurable amounts of $CaCO_3$.

After about one hour at 210° C., the dry solid had lost 14.98 percent of its starting weight and contained 0.13 percent $CaCO_3$.

After one hour at 350° C., a weight loss of 29.34 percent was observed and the resulting solid contained 32.68 percent $CaCO_3$.

After 1.5 hours at 500° C., a weight loss of 33.14 percent was observed and the solid contained 53.2 percent $CaCO_3$ and 0.41 percent $CaC_2O_4$.

EXAMPLE 6

Pure phosphoric acid (85% $H_3PO_4$) was diluted with water to a concentration of 30.9 percent $P_2O_5$. 640 grams of this solution was heated to 90° C. Unground, uncalcined, dry North Carolina Phosphate Rock containing 30.5 percent $P_2O_5$ was added to this hot solution with crystalline oxalic acid dihydrate in aliquots of 10 grams each every fifteen minutes over a period of three hours. Thus, the total quantity of phosphate rock and oxalic acid added was 120 grams of each. The resulting slurry, from which 203 grams of water had been evaporated over the three hour period, was then cooled to 35° C. and filtered. The raw filtrate weighed 420 grams and contained 37.8 percent $P_2O_5$. The filter cake was washed with two aliquots of hot water at 60° C. to recover the remainder of the entrained solubilized phosphate. The wet solid thus obtained weighed 204.1 grams and was dryed at 100° C. to 144.1 grams containing 4.5 percent total phosphate at $P_2O_5$. This represents a conversion of 82 percent of the phosphate in the phosphate rock to aqueous phosphoric acid under these conditions.

Although the invention has been described in preferred embodiments, it will be understood that the invention is not limited to the embodiments disclosed, but is capable of numerous rearrangements, modifications and substitutions without departing from the scope of the invention.

We claim:

1. A process for manufacturing ammonium phosphate utilizing synthesis gas, air and phosphate rock comprising:
   (a) separating synthesis gas into carbon monoxide and hydrogen fractions;
   (b) separating air into nitrogen and oxygen fractions;
   (c) reacting the carbon monoxide fraction and the oxygen fraction with water to form oxalic acid;
   (d) reacting the hydrogen fraction with the nitrogen fraction to form ammonia;
   (e) digesting phosphate rock with an acid solution comprising oxalic acid from step (c) and another acid for increasing the solubility of phosphate rock in the acid solution to form a slurry and thereby produce phosphoric acid and precipitated impurities including calcium oxalate;
   (f) separating the precipitated impurities from the phosphoric acid formed in step (e); and
   (g) reacting the phosphoric acid from step (f) with the ammonia to form ammonium phosphate.

2. The process as recited in claim 1, further comprising dehydrating and decomposing said calcium oxalate by heating to produce calcium carbonate and carbon monoxide.

3. The method as recited in claim 2, wherein the decomposition of calcium oxalate is effected by direct contact with hot synthesis gas to produce calcium carbonate and carbon monoxide and further comprising recycling the carbon monoxide formed from the decomposition of the calcium oxalate and utilizing it for the synthesis of oxalic acid.

4. The process as recited in claim 1, further comprising reacting the calcium oxalate with an aqueous ammonium carbonate solution to produce calcium carbonate and ammonium oxalate.

5. The process as recited in claim 4, further comprising recovering said ammonium oxalate and heating said ammonium oxalate to produce oxamide.

6. A process for manufacturing ammonium phosphate utilizing synthesis gas, air and phosphate rock comprising:
   (a) reacting hydrogen from synthesis gas and nitrogen from air to form ammonia;
   (b) utilizing oxygen from air and carbon monoxide from synthesis gas to form oxalic acid or derivatives thereof that form oxalic acid when hydrolyzed;
   (c) digesting phosphate rock with an acid solution comprising oxalic acid and another acid for increasing the solubility of phosphate rock in the acid solution, said oxalic acid being obtained from the oxalic acid produced in step (b) or by hydrolyzing the oxalic acid derivative formed in step (b), said digestion forming a slurry and forming phosphoric acid and precipitated impurities including calcium oxalate;
   (d) separating the precipitated impurities from the phosphoric acid; and
   (e) reacting the phosphoric acid with the ammonia to form ammonium phosphate.

7. The process as recited in claim 6, further comprising dehydrating and decomposing said calcium oxalate by heating to produce calcium carbonate and carbon monoxide.

8. The method as recited in claim 7, wherein the decomposition of calcium oxalate is effected by direct contact with hot synthesis gas to produce calcium carbonate and carbon monoxide and further comprising recycling the carbon monoxide formed from the decomposition of the calcium oxalate and utilizing it for the synthesis of oxalic acid.

9. The process as recited in claim 6, further comprising reacting the calcium oxalate with an aqueous ammonium carbonate solution to produce calcium carbonate and ammonium oxalate.

10. The process as recited in claim 9, further comprising recovering said ammonium oxalate and heating said ammonium oxalate to produce oxamide.

* * * * *